US010540594B2

(12) United States Patent
Li et al.

(10) Patent No.: US 10,540,594 B2
(45) Date of Patent: Jan. 21, 2020

(54) IDENTIFYING ABNORMAL PUMPJACK CONDITIONS

(71) Applicant: INTERNATIONAL BUSINESS MACHINES CORPORATION, Armonk, NY (US)

(72) Inventors: Li Li, Beijing (CN); Wen Ting Mo, Beijing (CN); Ji Jiang Song, Beijing (CN); Chunhua Tian, Beijing (CN); Feng Juan Wang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1160 days.

(21) Appl. No.: 14/858,500

(22) Filed: Sep. 18, 2015

(65) Prior Publication Data

US 2017/0083819 A1 Mar. 23, 2017

(51) Int. Cl.
*G06F 19/00* (2018.01)
*G06N 5/04* (2006.01)
*E21B 47/00* (2012.01)

(52) U.S. Cl.
CPC .......... *G06N 5/045* (2013.01); *E21B 47/0008* (2013.01)

(58) Field of Classification Search
CPC .............. F04B 49/065; F04B 2201/121; E21B 43/127; E21B 43/26
USPC ................................ 702/2–14, 182–185, 188
See application file for complete search history.

(56) References Cited

U.S. PATENT DOCUMENTS

| 2008/0240930 | A1* | 10/2008 | Palka | E21B 43/127 417/42 |
| 2010/2228398 | | 9/2010 | Powers et al. | |
| 2010/0295673 | A1 | 11/2010 | Ahmad | |
| 2011/0247816 | A1* | 10/2011 | Carter, Jr. | E21B 43/26 166/298 |
| 2013/0080117 | A1 | 3/2013 | Liu et al. | |
| 2013/0115107 | A1 | 5/2013 | Pons | |
| 2013/0333880 | A1 | 12/2013 | Raglin et al. | |
| 2014/0088875 | A1* | 3/2014 | Krauss | E21B 43/127 702/6 |

(Continued)

OTHER PUBLICATIONS

Bezerra, et al., "Pattern Recognition for Downhole Dynamometer Card in Oil Rod Pump System Using Artificial Neural Networks", ICEIS 2009—Proceedings of the 11th International Conference on Enterprise Information Systems, vol. AIDSS, May 2009 pp. 1-4.

(Continued)

*Primary Examiner* — Edward Raymond
(74) *Attorney, Agent, or Firm* — Tutunjian & Bitetto, P.C.; Grant Johnson

(57) ABSTRACT

A system and method are provided. The system includes a feature calculator calculates features of a Pressure Volume diagram. The system further includes a pumpjack condition separator separates normal pumpjack conditions from abnormal pumpjack conditions using a hierarchical decision tree, the conditions being determined using the features. The system also includes a compound indicator generator generates a compound indicator when a predetermined number of at least one of features and conditions exceed respective thresholds. The system additionally includes an abnormal PV diagram indicator provides a user-perceptible indication that the PV diagram is abnormal when the compound indicator exceeds a compound indicator threshold.

20 Claims, 9 Drawing Sheets

(56) References Cited

U.S. PATENT DOCUMENTS

2014/0373603 A1* 12/2014 Zhang .................... G01F 9/00
                                                                                                     73/49.5

OTHER PUBLICATIONS

Feng, et al., "Fault Diagnosis of Sucker-Rod Pumping System Using Support Vector Machine", ICCIP 2012, Part II, CCIS 289, 2012, pp. 179-189.
OperateIT SCADA Vision, Dynamometer, ABB Inc., 2 Pags. www.abb.com/oilandgas.
Weatherford, Weatherford Production Optimization, Rod Pumping, 1 page. www.ep-weatherford.com.

* cited by examiner

IDENTIFYING ABNORMAL PUMPJACK CONDITIONS

BACKGROUND

Technical Field

The present invention relates generally to the petroleum field and, in particular, to identifying abnormal pumpjack conditions.

Description of the Related Art

A pumpjack (also called an oil horse, or jack pump) is the over-ground drive for a reciprocating piston pump in an oil well. There are millions of pumpjacks all over the world. The conditions of pumpjacks are directly linked to the speed and quality of oil production. A Pressure-Volume diagram (or indicator diagram) is an effective way to identify problems with a pumpjack. The shape of the diagram shows the details of the pumpjack conditions. However, reading the Pressure-Volume diagram not only requires a lot of experience, but it is also a time consuming process. Thus, it is a costly and time consuming endeavor to monitor the conditions of pumpjacks.

SUMMARY

According to an aspect of the present principles, a system is provided. The system includes a feature calculator calculates features of a Pressure Volume diagram. The system further includes a pumpjack condition separator separates normal pumpjack conditions from abnormal pumpjack conditions using a hierarchical decision tree, the conditions being determined using the features. The system also includes a compound indicator generator generates a compound indicator when a predetermined number of at least one of features and conditions exceed respective thresholds. The system additionally includes an abnormal PV diagram indicator provides a user-perceptible indication that the PV diagram is abnormal when the compound indicator exceeds a compound indicator threshold.

According to another aspect of the present principles, a method is provided. The method includes calculating, by a feature calculator, features of a Pressure Volume diagram. The method further includes separating, by a pumpjack condition separator, normal pumpjack conditions from abnormal pumpjack conditions using a hierarchical decision tree. The conditions are determined using the features. The method also includes generating, by a compound indicator generator, a compound indicator when a predetermined number of at least one of features and conditions exceed respective thresholds. The method additionally includes providing, by an abnormal PV diagram indicator, a user-perceptible indication that the PV diagram is abnormal when the compound indicator exceeds a compound indicator threshold.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to identifying abnormal pumpjack conditions.

The present principles are directed to a system and method for detecting abnormal indicator diagrams for a pumpjack.

The challenging problems in automatically processing indicator diagrams include: (1) abundance; (2) redundancy; (3) complexity; and (4) uniqueness. Regarding abundance, there could be a minimum of thousands of Pressure-Volume diagrams produced hourly/daily for a small sized oil field. Regarding redundancy, there are many similar Pressure-Volume diagrams produced. Regarding complexity, there are a variety of factors associated with pump jacks. Regarding uniqueness, one pumpjack at one oil well tends to produce similar normal Pressure-Volume diagrams.

According to the present principles, many features can be used to quantify an indicator diagram, in these way, simplifying each diagram and dealing with the abundance problem. In an embodiment, the present principles produce a compound indicator to monitor the conditions to deal with the redundancy problem. A hierarchical structure is used to separate key features from non-key features. When extracting features, in an embodiment, the present principles start by simplifying diagrams that include a maximum amount of details, and then continue to reduce the amount of details. In this way, the complexity issue is addressed. In the end, for each well, a baseline can be established to deal with the uniqueness of each well.

Figure 6:
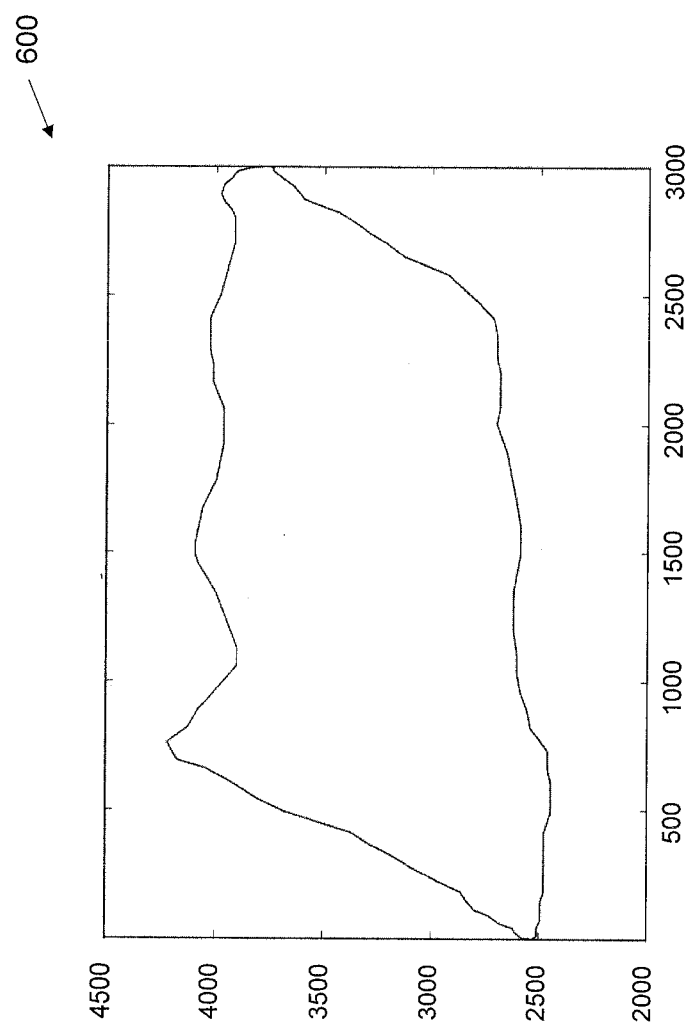
FIG. 6 shows an exemplary Pressure Volume diagram 600 to which the present principles can be applied, in accordance with an embodiment of the present principles.

Using the present principles, the oil industry can quickly identify abnormal conditions for pumpjacks and save a huge amount of resources. In an embodiment, the present principles employ several features to measure/quantify a Pressure-Volume diagram (PV diagram) including, but not limited to, area, convex hull, simplify outlines, key points identification, identification of parallel lines, calculate angles between non-parallel lines, and calculate length of major lines. FIG. 6 shows an exemplary PV diagram 600 to which the present principles can be applied, in accordance with an embodiment of the present principles.

Figure 1:
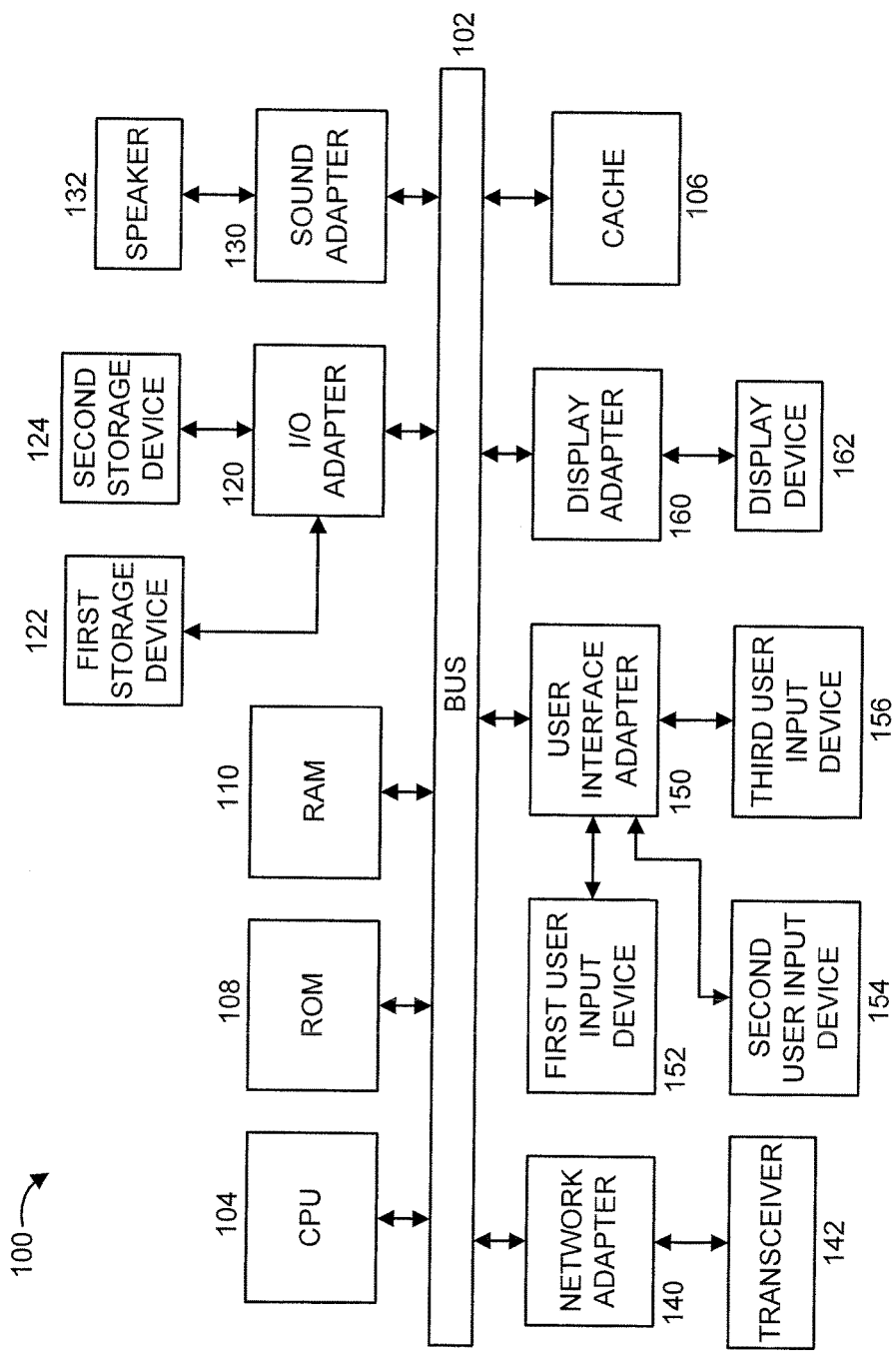
FIG. 1 shows an exemplary processing system 100 to which the present principles may be applied, in accordance with an embodiment of the present principles.

In an embodiment, for a single pump and oil well, the present principles produce/monitor key compound indicators. Such producing/monitoring can involve, but is not limited to, establishing a baseline for each pump and well, separating key features from non-key features, and using a hierarchical structure to separate normal conditions from abnormal conditions. In an embodiment, key features can include, but are not limited to, area, key points, parallel lines, angles, and so forth. In an embodiment, non-key features include, but are not limited to, the length of convex hull, outlines, the lengths of major lines, and so forth FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
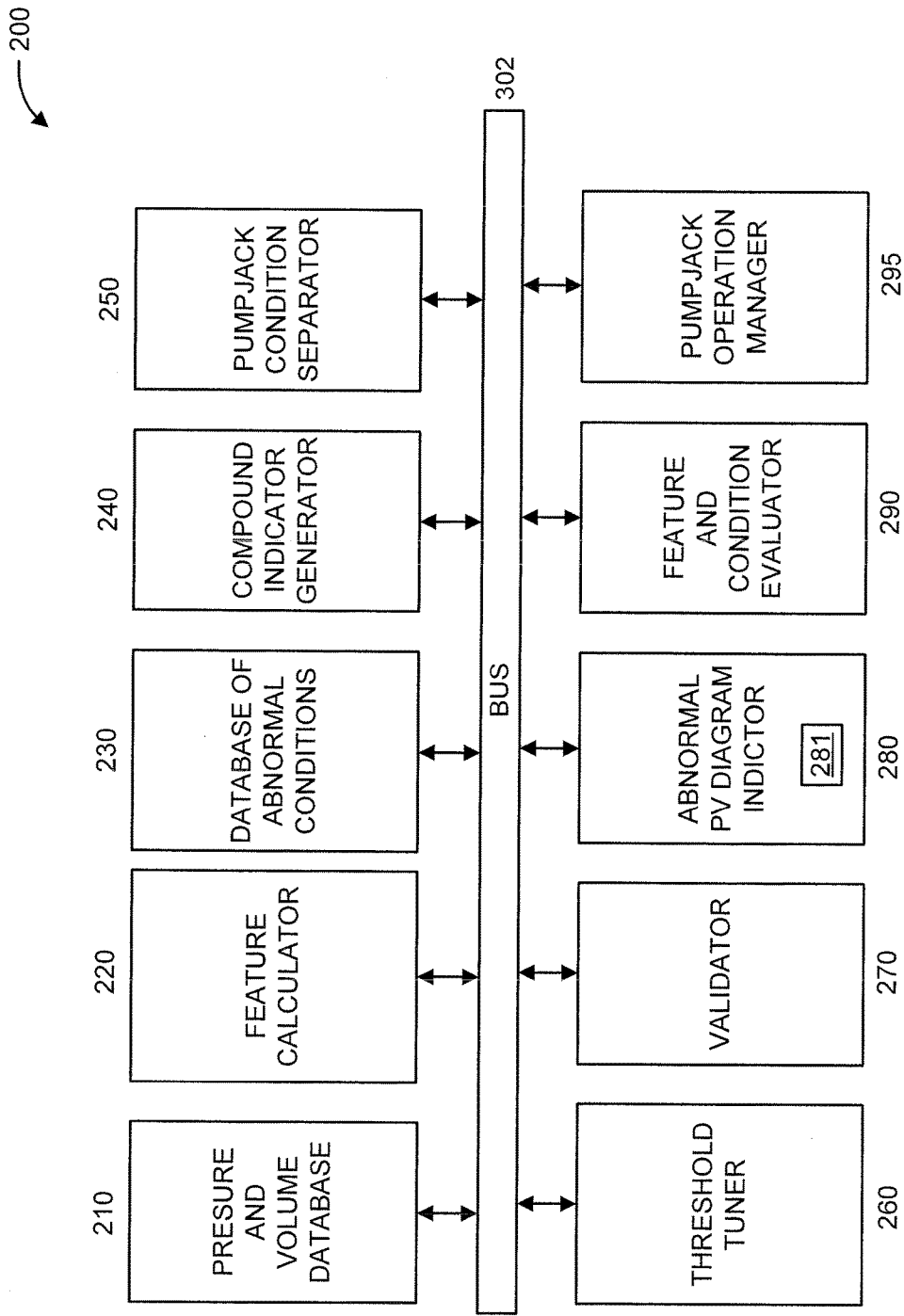
FIG. 2 shows an exemplary system 200 for identifying abnormal pumpjack conditions, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 3:
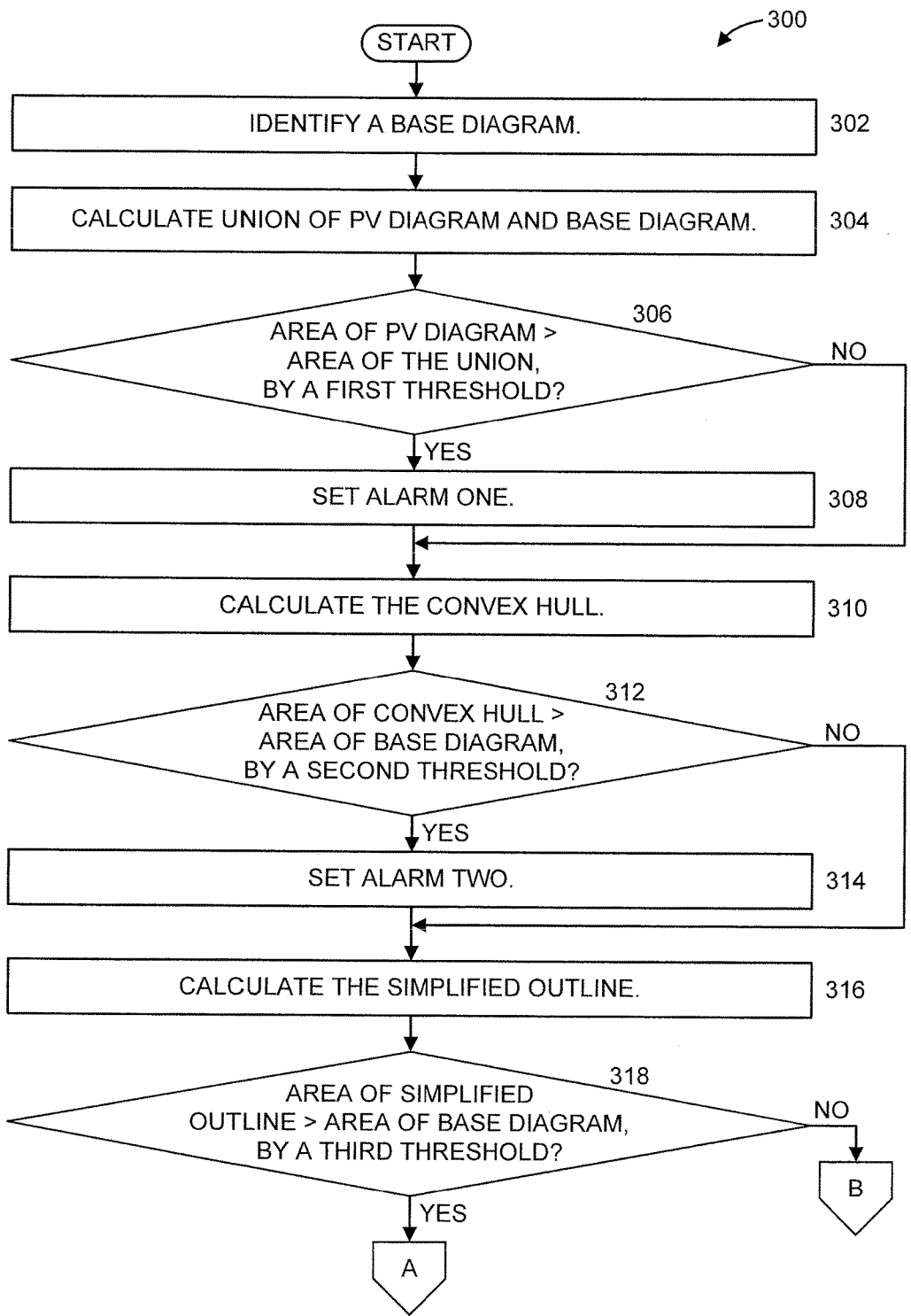
FIGS. 3-5 shows an exemplary method 300 for identifying abnormal conditions in a pumpjack, in accordance with an embodiment of the present principles.
Figure 4:
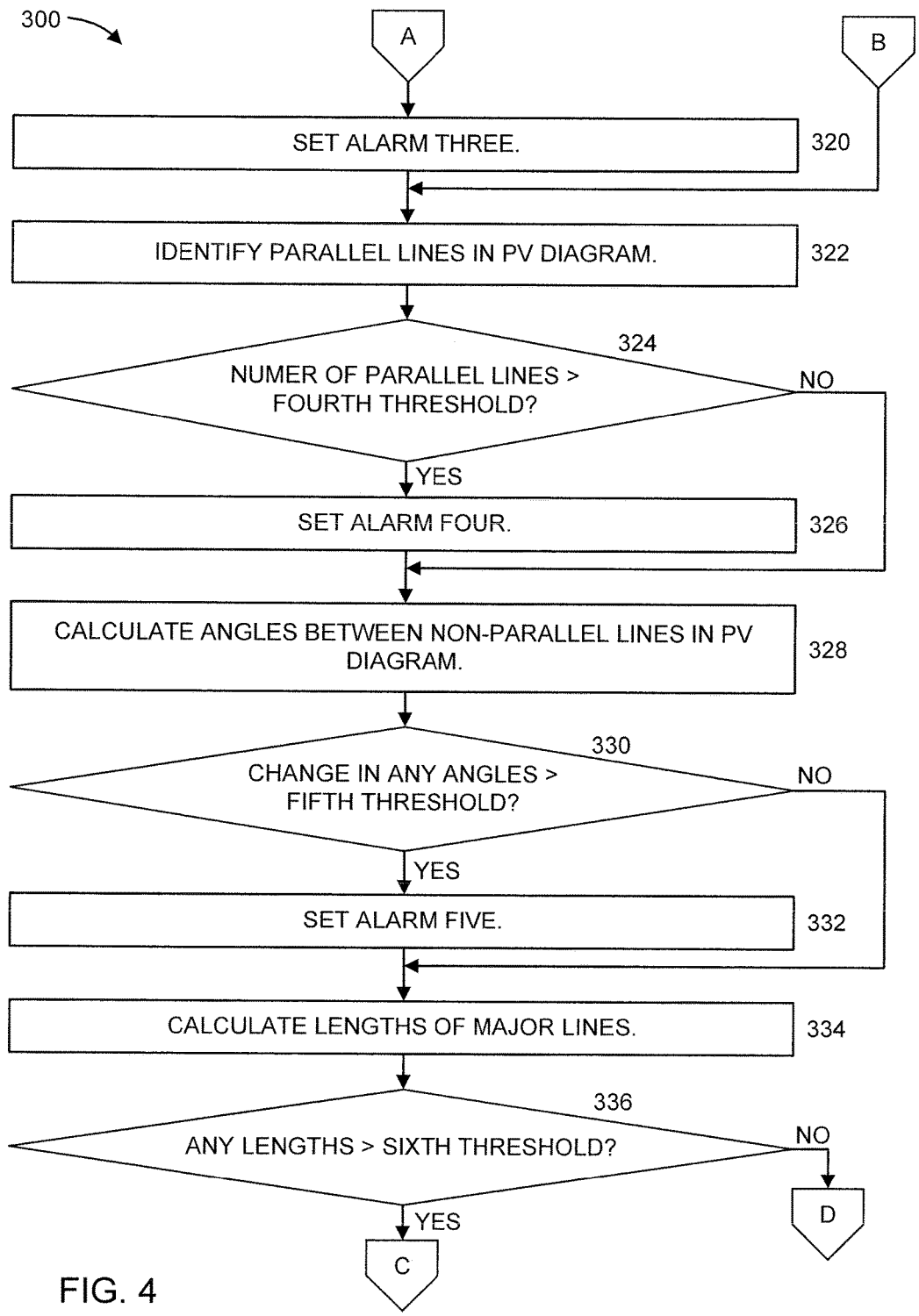
Figure 5:
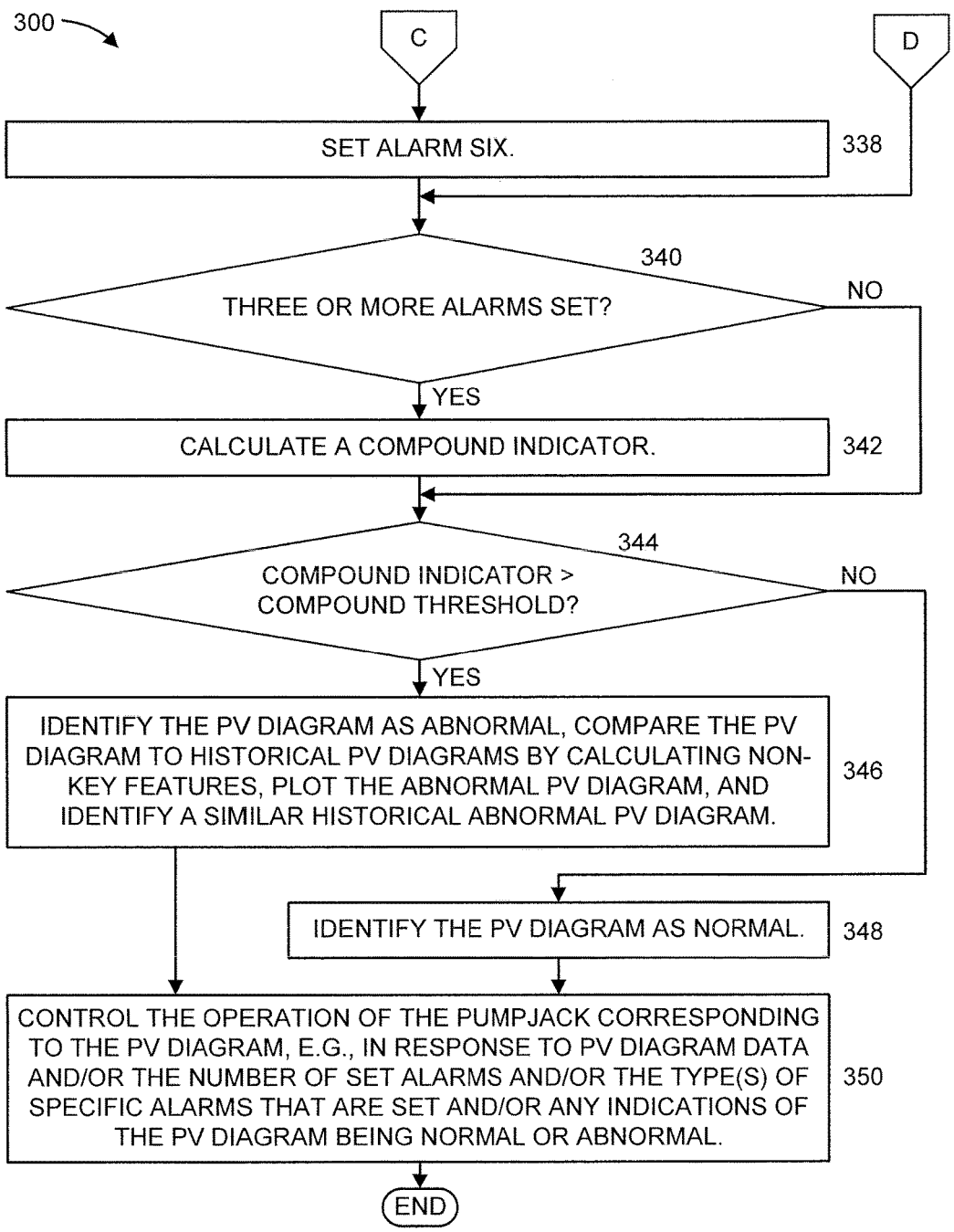

Further, it is to be appreciated that processing system 100 may perform at least part of the method described herein including, for example, at least part of method 300 of FIGS. 3-5. Similarly, part or all of system 200 may be used to perform at least part of method 300 of FIGS. 3-5.

FIG. 2 shows an exemplary system 200 for identifying abnormal pumpjack conditions, in accordance with an embodiment of the present principles.

The system 200 includes a pressure and volume database 210, a feature calculator 220, a database of (historical) abnormal conditions 230, a compound indicator generator 240, a pumpjack condition separator 250, a threshold tuner 260, a validator 270, an abnormal PV diagram indicator 280, a feature and condition evaluator 290, a pumpjack operation manager 295, and a historical abnormal diagram matcher 296.

The pressure and volume database 210 includes operating data on pressures and volumes for a pumpjack.

The feature calculator 220 calculates features of a PV diagram. The features can include key features and non-key features. The feature calculator 220 can use one or more approaches/algorithms to calculate the features.

In an embodiment, features of the PV diagrams are calculated using an approach based on union. For example, if A is a Polygon and B is a Polygon, then by the union of A with B, we mean all of the points included in A and all of the points included in B. The union of A with B will sometimes be denoted by A (the "cup" union sign) B and sometimes by A+B.

In an embodiment, features of the PV diagrams are calculated using an approach based on convex hull, which involves find a point with a median x coordinate (time: O(n) or O(n log n) by sorting), computing the convex hull of each half (recursive execution), and combining the two convex hulls by finding common tangents.

In an embodiment, features of the PV diagrams are calculates using a simplify approach, which can involve one or more of simplifying by removing sudden changes in angles, simplifying by removing sudden changes in areas, and simplifying by removing the least important features. The least important features can be pre-specified or dynamically identified as such. In an embodiment, the features of the PV diagram are calculating using a simplification technique that increasingly simplifies the PV diagram to provide a plurality of simplified representations of the PV diagram from which the features are calculated.

The database of abnormal conditions 230 includes historical data of abnormal pumpjack conditions.

The compound indicator generator 240 generates a compound indicator. In an embodiment, this compound indicator takes into account of three types of measures (area, length, and angles) for PV diagrams. In an embodiment, the area, the length and the angles of the original diagram, convex hull and the simplified shape were all obtained and combined. As this compound indicator produces a single variable, it can be easily treated as a time series and abnormal conditions can be detected.

In an embodiment, the compound indicator is calculated as follows:

$$\text{Compound indicator} = \frac{(\% \ U)\text{area} + (\% \ U) \text{Convex·area} + (\% \ U) \text{simplify·area}}{3} + \frac{(\% \ U)\text{len} + (\% \ U) \text{Convex·len} + (\% \ U) \text{simplify·len}}{3} + \frac{(\% \ U) \text{average·angle} + (\% \ U) \text{convex·average} + (\% \ U) \text{simplify·averageangle}}{3}$$

where (% U)Area is the ratio between the area of the union (the union of the preceding diagram and the base diagram) and the area of the base diagram; (% U)Convex.area is the ratio between the area of the union (the union of the convex hull and the base diagram) and the area of the base diagram; (% U)Simplify.area is the ratio between the area of the union (the union of the simplified polygon and the base diagram) and the area of the base diagram; (% U)len is the ratio between the length of the preceding diagram and the length of the base diagram; (% U)Convex.len is the ratio between the length of the convex hull and the length of the base diagram; (% U)simplify.len is the ratio between the length of the simplified polygon and the length of the base diagram; (% U)average.angle is the ratio between the average angles of the preceding diagram and the average angles of the base diagram; (% U)convex.average is the ratio between the average angles of the convex hull and the average angles of the base diagram; and (% U)simplify.averageangle is the ratio between the average angles of the simplified polygon and the average angles of the base diagram.

The pumpjack condition separator 250 separates normal pumpjack conditions from abnormal pumpjack conditions. In an embodiment, the pumpjack condition separator 250 uses a hierarchical decision tree to separate normal conditions from abnormal conditions. Normal and abnormal conditions are determined with respect to, and from, the features. For example, the existence of a feature itself may represent an abnormal condition. As such, the terms feature and condition may be used interchangeably. In another case, the value of the feature may represent an abnormal condition. These and other ways to determine normal and abnormal conditions are readily determined from one of ordinary skill in the art given the teachings of the present principles provided herein, while maintaining the spirit of the present principles.

The threshold tuner 260 performs threshold tuning using historical records, for example, from the database of abnormal conditions 230.

The feature and condition evaluator 290 evaluates identified features and/or conditions using one or more thresholds to determine if respective features and/or conditions exceed the thresholds.

The validator 270 validates whether the identified abnormal condition is a false alarm. If it is a false alarm, then the identified abnormal condition will be marked to re-tune the threshold. As the evaluator has narrowed down the possible abnormal conditions to a small quantity, the validator can rely on the visual inspection of a field expert. The validator serves as a quality assurance for the identification of abnormal PV diagram.

The abnormal PV diagram indicator 280 provides an indication that the PV diagram is abnormal. In an embodiment, the abnormal PV diagram indicator 280 outputs the abnormal PV diagram. The abnormal PV diagram indicator 280 can also include an alarm generator 281 for setting, keeping track of, and indicating alarms that are set.

The historical abnormal diagram matcher 296 compares the PV diagram that is indicated as being abnormal to historical abnormal diagrams based on key features and/or non-key features, identifies a similar historical abnormal PV diagram, and outputs the similar historical abnormal PV diagram.

The pumpjack operation manager 295 manages an operational state of the pumpjack responsive to the user-perceptible indication and/or the PV diagram data and/or the number of set alarms and/or the type (that is, what the alarm relates to, e.g., area, line length, etc.) of specific alarms that are set. The pumpjack operation manager 295 can cause the pumpjack shut down, to reduce it capacity, and/or other any other intended operational state response to any determinations made from a PV diagram.

In the embodiment shown in FIG. 2, the elements thereof are interconnected by a bus 201. However, in other embodiments, other types of connections can also be used. Moreover, in an embodiment, at least one of the elements of system 200 is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. These and other variations of the elements of system 200 are readily determined by one of ordinary skill in the art, given the teachings of the present principles provided herein, while maintaining the spirit of the present principles.

FIGS. 3-5 show an exemplary method 300 for identifying abnormal conditions in a pumpjack, in accordance with an embodiment of the present principles.

At step 302, identify a base diagram (for example, by historical data and/or expert opinion).

At step 304, calculate the union of an input PV diagram to be evaluated (hereinafter "PV diagram") and the base diagram.

At step 306, determine whether the area of the PV diagrams exceeds the area of the union by a first threshold. If so, then the method continues to step 308. Otherwise, the method continues to step 310.

At step 308, set alarm one.

At step 310, calculate the convex hull.

At step 312, determine whether the area of the convex hull exceeds the area of the base diagram by a second threshold. If so, then the method continues to step 314. Otherwise, the method continues to step 316.

At step 314, set alarm two.

At step 316, calculate the simplified outline.

At step 318, determine whether the area of the simplified outline exceeds the area of the base diagram by a third threshold. If so, then the method continues to step 320. Otherwise, the method continues to step 322.

At step 320, set alarm three.

At step 322, identify parallel lines in the PV diagram.

At step 324, determine whether the number of parallel lines exceeds a fourth threshold. If so, the method continues to step 326. Otherwise, the method continues to step 328.

At step 326, set alarm four.

At step 328, calculate the angles between non-parallel lines in the PV diagram.

At step 330, determine whether a change in any of the angles exceeds a fifth threshold. If so, then the method continues to step 332. Otherwise, the method continues to step 334.

At step 332, set alarm five.

At step 334, calculate the lengths of major lines.

At step 336, determine whether any of the lengths exceed a sixth threshold. If so, then the method continues to step 338. Otherwise, the method continues to step 340.

At step 338, set alarm six.

At step 340, determine whether three or more alarms are set. If so, then the method proceeds to step 342. Otherwise, the method proceeds to step 352.

At step 342, calculate a compound indicator.

At step 344, determine whether the compound indicator exceeds a compound threshold. If so, then the method continues to step 346. Otherwise, the method continues to step 348.

At step 346, identify the PV diagram as abnormal, compare the (abnormal) PV diagram to historical abnormal PV diagrams by calculating non-key features, plot the abnormal PV diagram, and identify a similar historical abnormal PV diagram. Step 346 can include providing user-perceptible indications that the PV diagram is abnormal and user perceptible indications of the PV diagram and the similar historical diagram. The user perceptible indications can include separate or overlaid visually displayed PV diagrams or representations thereof, e.g., simplified, etc.

At step 348, identify the PV diagram as normal. Step 350 can include providing a user perceptible indication that the PV diagram is normal. For example, a green (or other color) light, or other symbol, sound, vibration, and so forth may be used to indicate that the PV diagram is normal. In an embodiment, step 348 is omitted, and only abnormal PV diagrams are indicated, for example in step 346.

At step 350, control the operation of the pumpjack corresponding to the PV diagram, in response to, for example, the PV diagram data and/or number of set alarms and/or the type(s) of specific alarms that are set and/or any indications of the PV diagram being normal or abnormal. In an embodiment, step 350 can include selecting or switching an operational state of the pumpjack. In an embodiment, step 350 can include temporarily suspending pumping and/or pressure inducing operations of the pumpjack until further investigation can be performed.

The present principles can provides various degrees/levels of granularity in analyzing the PV diagrams. Moreover, the present principles can transition from one level to another, and so on. For example, in one embodiment, everything in the PV diagram is included, thus providing the maximum amount of details. In another embodiment, only major characteristics are included. In yet another embodiment, different aspects of major characteristics are included. In still another embodiment, the uniqueness of the PV diagram is quantified. As noted above, one or more of these levels can be invoked when processing a PV diagram, including hierarchical transitions from more detail to less detail.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
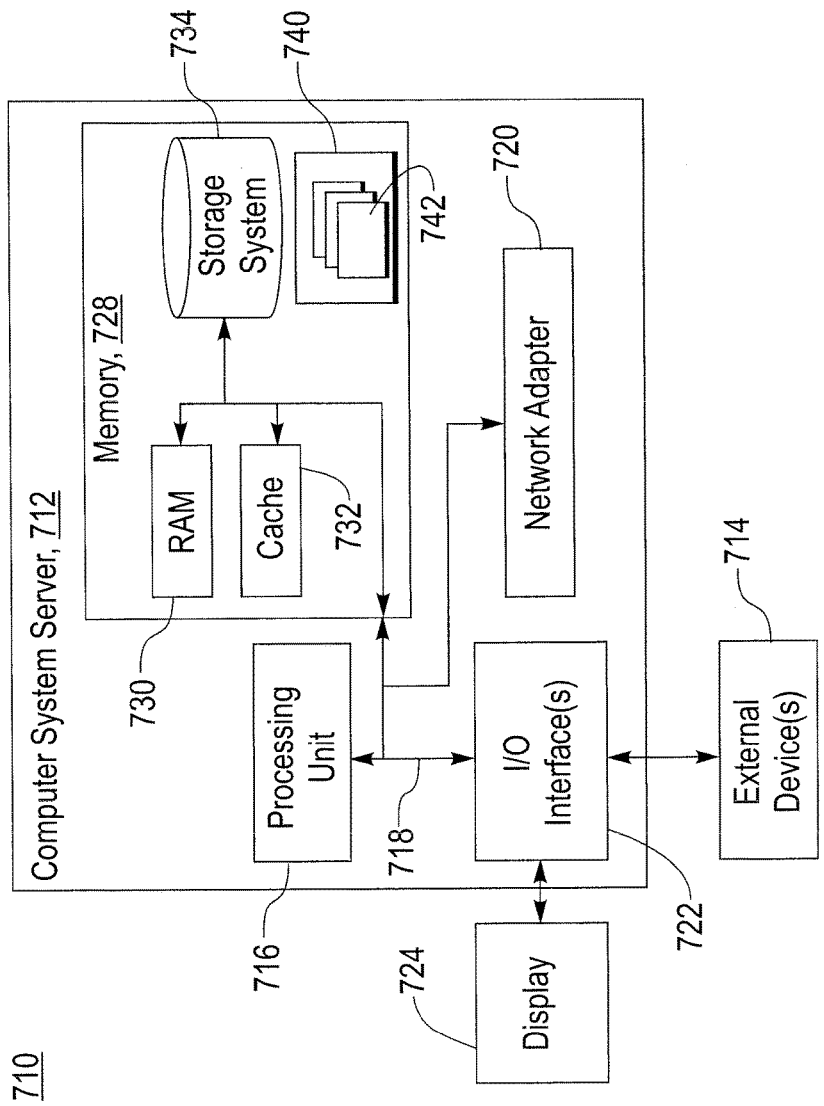
FIG. 7 shows an exemplary cloud computing node 710, in accordance with an embodiment of the present principles.

Referring now to FIG. 7, a schematic of an example of a cloud computing node 710 is shown. Cloud computing node 710 is only one example of a suitable cloud computing node and is not intended to suggest any limitation as to the scope of use or functionality of embodiments of the invention described herein. Regardless, cloud computing node 710 is capable of being implemented and/or performing any of the functionality set forth hereinabove.

In cloud computing node 710 there is a computer system/server 712, which is operational with numerous other general purpose or special purpose computing system environments or configurations. Examples of well-known computing systems, environments, and/or configurations that may be suitable for use with computer system/server 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 712 may be described in the general context of computer system executable instructions, such as program modules, being executed by a computer system. Generally, program modules may include routines, programs, objects, components, logic, data structures, and so on that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 712 in cloud computing node 710 is shown in the form of a general-purpose computing device. The components of computer system/server 712 may include, but are not limited to, one or more processors or processing units 716, a system memory 728, and a bus 718 that couples various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 712 typically includes a variety of computer system readable media. Such media may be any available media that is accessible by computer system/server 712, and it includes both volatile and non-volatile media, removable and non-removable media.

System memory 728 can include computer system readable media in the form of volatile memory, such as random access memory (RAM) 730 and/or cache memory 732. Computer system/server 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the invention.

Program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer system/server 712 may also communicate with one or more external devices 714 such as a keyboard, a pointing device, a display 724, etc.; one or more devices that enable a user to interact with computer system/server 712; and/or any devices (e.g., network card, modem, etc.) that enable computer system/server 712 to communicate with one or more other computing devices. Such communication can occur via Input/Output (I/O) interfaces 722. Still yet, computer system/server 712 can communicate with one or more networks such as a local area network (LAN), a general wide area network (WAN), and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples, include, but are not limited to: microcode, device drivers, redundant processing units, external disk drive arrays, RAID systems, tape drives, and data archival storage systems, etc.

Figure 8:
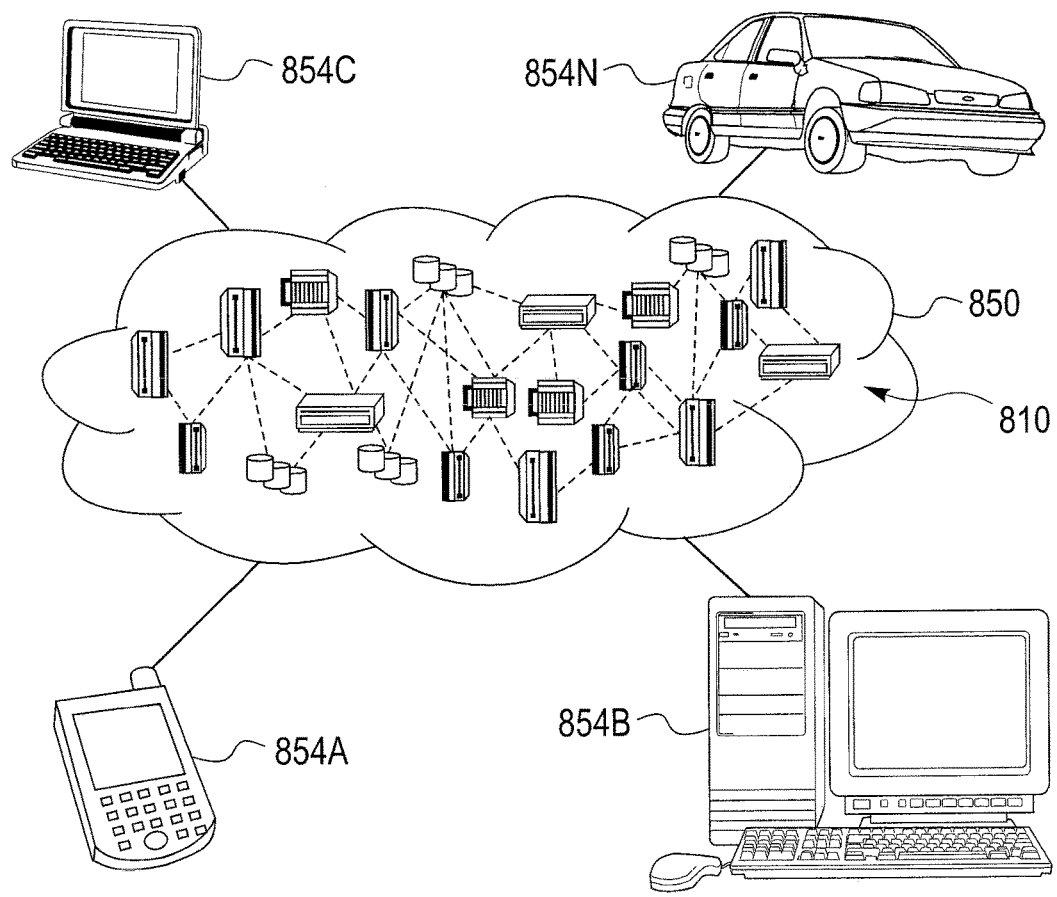
FIG. 8 shows an exemplary cloud computing environment 850, in accordance with an embodiment of the present principles.

Referring now to FIG. 8, illustrative cloud computing environment 850 is depicted. As shown, cloud computing environment 850 comprises one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
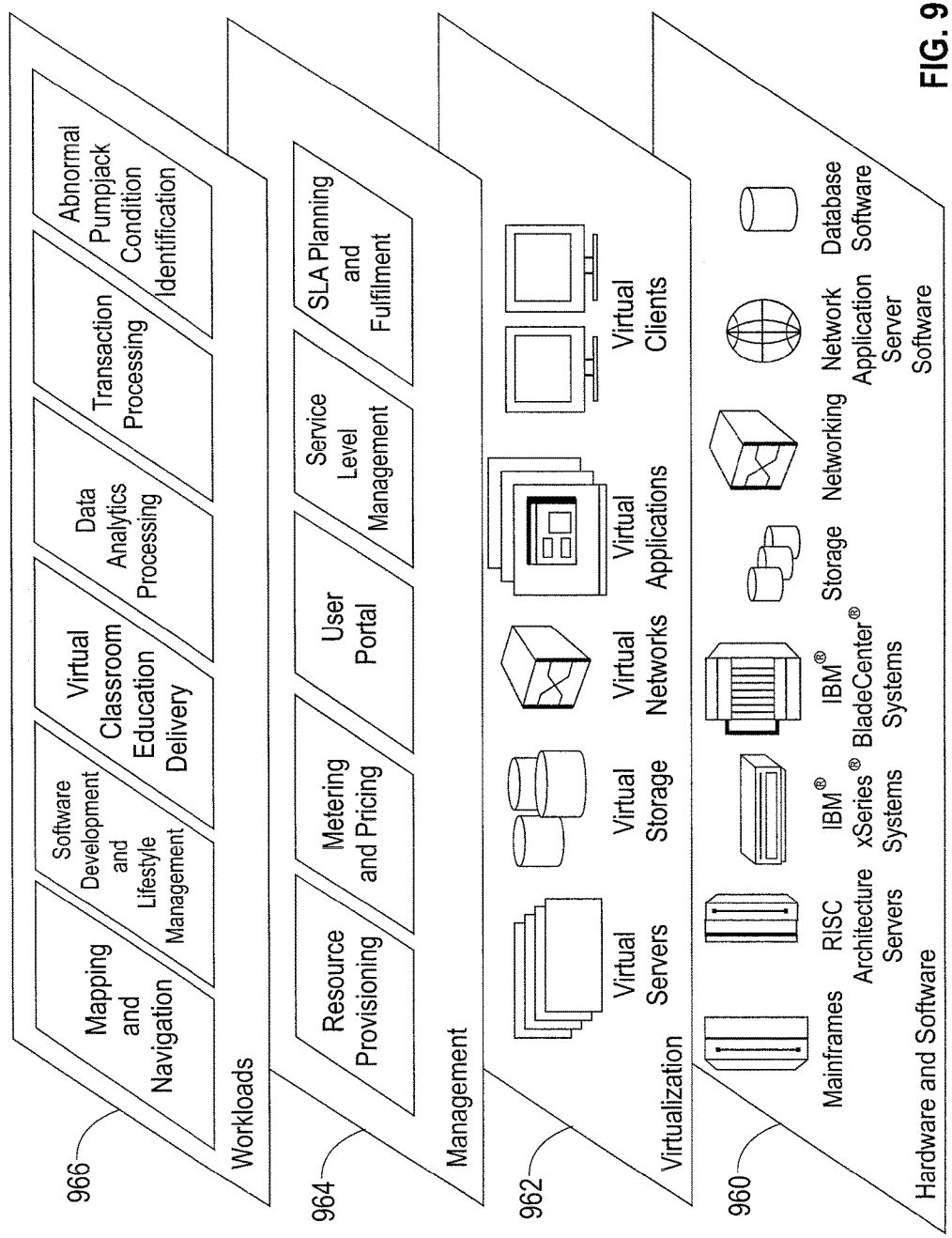
FIG. 9 shows exemplary abstraction model layers, in accordance with an embodiment of the present principles.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 962 provides an abstraction layer from which the following examples of virtual entities may be provided: virtual servers; virtual storage; virtual networks, including virtual private networks; virtual applications and operating systems; and virtual clients.

In one example, management layer 964 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 966 provides examples of functionality for which the cloud computing environment may be utilized. Examples of workloads and functions which may be provided from this layer include: mapping and navigation; software development and lifecycle management; virtual classroom education delivery; data analytics processing; transaction processing; and abnormal pumpjack condition identification.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A system, comprising:
   a feature calculator calculates features of a Pressure Volume diagram;
   a pumpjack condition separator separates normal pumpjack conditions from abnormal pumpjack conditions using a hierarchical decision tree, the conditions being determined using the features;
   a compound indicator generator generates a compound indicator when a predetermined number of at least one of features and conditions exceed respective thresholds; and
   an abnormal PV diagram indicator provides a user-perceptible indication that the PV diagram is abnormal when the compound indicator exceeds a compound indicator threshold.

2. The system of claim 1, further comprising:
   a pressure and volume database stores operating data on pressures and volumes for a pumpjack; and
   a database of abnormal conditions stores historical data of abnormal pumpjack conditions,
   wherein the feature calculator calculates the features of the Pressure Volume diagram using the operating data and the historical data.

3. The system of claim 2, further comprising a threshold tuner for performing threshold tuning using the historical data of abnormal pumpjack conditions stored in the database of abnormal conditions.

4. The system of claim 1, wherein different alarms are set for different ones of the features and the conditions, and the system further comprises an operation manager for managing an operational state of the pumpjack responsive to at least one of the user-perceptible indication, PV diagram data, a number of set alarms and a type of specific alarms that are set.

5. The system of claim 1, wherein the features comprise key features and non-key features.

6. The system of claim 1, wherein the features of the PV diagram are calculated using a union-based technique.

7. The system of claim 1, wherein the features of the PV diagram are calculated using a convex hull-based technique.

8. The system of claim 7, wherein the convex hull-based technique comprises:
   finding a point in the PV diagram with a median x coordinate;
   computing a convex hull of each of two halves determined with respect to the median x coordinate; and
   combining the convex hull of each of the two halves by finding common tangents in the two halves.

9. The system of claim 1, wherein the features of the PV diagram are calculating using a simplification technique.

10. The system of claim 9, wherein the simplification technique comprises at least one of simplifying by removing changes in angles greater than a first threshold, simplifying by removing changes in areas greater than a second threshold, and simplifying by removing a set of least important features.

11. The system of claim 9, wherein simplification technique increasingly simplifies the PV diagram to provide a plurality of simplified representations of the PV diagram from which the features are calculated.

12. The system of claim 1, wherein the features of the PV diagram are calculated using a union-based technique, a convex hull-based technique, and a simplification technique.

13. The system of claim 12, wherein the compound indicator is determined based on the union-based technique, the convex hull-based technique, and the simplification technique.

14. The system of claim 1, further comprising a validator for validating whether a given one of the abnormal pumpjack conditions is a valid false alarm, and marking the given one of the abnormal pumpjack conditions for threshold re-tuning.

15. A method, comprising:
   calculating, by a feature calculator, features of a Pressure Volume diagram;
   separating, by a pumpjack condition separator, normal pumpjack conditions from abnormal pumpjack conditions using a hierarchical decision tree, the conditions being determined using the features;
   generating, by a compound indicator generator, a compound indicator when a predetermined number of at least one of features and conditions exceed respective thresholds; and
   providing, by an abnormal PV diagram indicator, a user-perceptible indication that the PV diagram is abnormal when the compound indicator exceeds a compound indicator threshold.

16. The method of claim 15, wherein different alarms are set for different ones of the features and the conditions, and the system further comprises an operation manager for managing an operational state of the pumpjack responsive to at least one of the user-perceptible indication, PV diagram data, a number of set alarms and a type of specific alarms that are set.

17. The method of claim 15, wherein the features of the PV diagram are calculating using a simplification technique that increasingly simplifies the PV diagram to provide a plurality of simplified representations of the PV diagram from which the features are calculated.

18. The method of claim 15, wherein the features of the PV diagram are calculated using a union-based technique, a convex hull-based technique, and a simplification technique.

19. The method of claim 18, wherein the compound indicator is determined based on the union-based technique, the convex hull-based technique, and the simplification technique.

20. A non-transitory article of manufacture tangibly embodying a computer readable program which when executed causes a computer to perform the steps of claim 15.

* * * * *